E. I. CHAPIN AND F. E. BAKER.
CUTTING TOOL.
APPLICATION FILED MAR. 12, 1919.
1,351,467.
Patented Aug. 31, 1920.
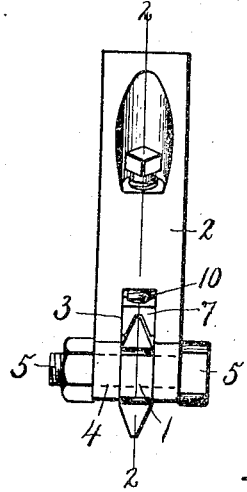
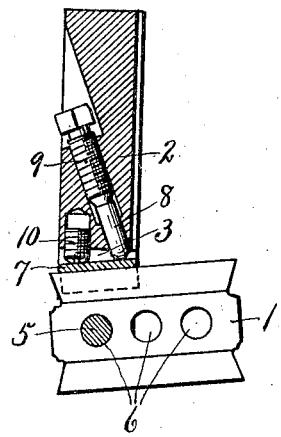
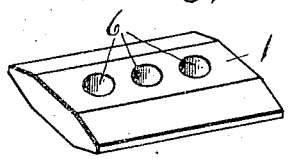
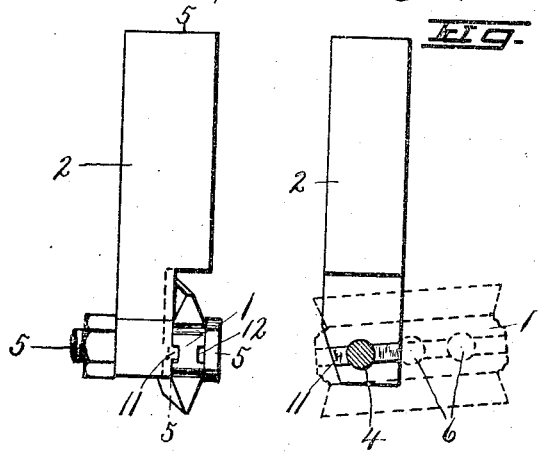
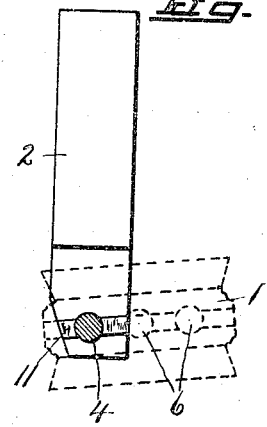
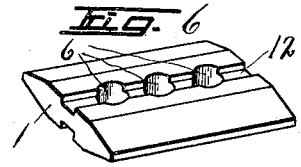
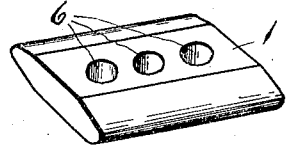
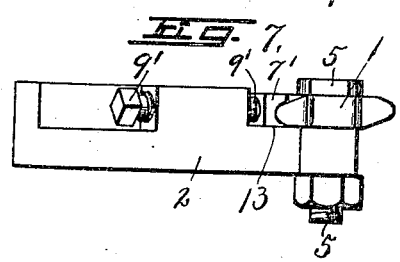
INVENTOR
E. J. Chapin and
F. E. Baker
BY Howard P. Denison
ATTORNEY

UNITED STATES PATENT OFFICE.

EDWARD I. CHAPIN AND FRANK E. BAKER, OF SYRACUSE, NEW YORK, ASSIGNORS TO CHAPIN & BAKER MANUFACTURING COMPANY, INC., OF SYRACUSE, NEW YORK, A CORPORATION OF NEW YORK.

CUTTING-TOOL.

1,351,467. Specification of Letters Patent. Patented Aug. 31, 1920.

Application filed March 12, 1919. Serial No. 282,169.

*To all whom it may concern:*

Be it known that we, EDWARD I. CHAPIN and FRANK E. BAKER, citizens of the United States of America, and residents of Syracuse, in the county of Onondaga in the State of New York, have invented new and useful Improvements in Cutting-Tools, of which the following, taken in connection with the accompanying drawings, is a full, clear, and exact description.

This invention relates to certain improvements in cutting tools for lathes, planers and other milling or gear cutting machines in which a device of this character may be of use and refers more particularly to the structure of the blade and to the holder therefor.

The main object is to increase the life, rigidity and working efficiency of tools of this character.

Another object is to enable the blades to be cut to the desired length from specially rolled stock bars in such manner as to form upon each blade a multiplicity of in this instance four cutting edges of substantially the same form or cross sectional contour, whereby either cutting edge may be easily and quickly applied to the same work by simply reversing the blade end for end or edge for edge in the holder.

A further object is to enable either cutting edge to be easily and quickly sharpened by grinding without in any way deforming the transversed contour thereof, and at the same time producing the necessary under cut for clearance without affecting the rigidity of the main body of the blade.

In other words, we have sought to provide a substantially rectangular blade having its opposite lengthwise edges of substantially the same cross sectional form and size capable of being used from either end to approximately the transverse center of the blade as the cutting edges are worn away in use and by sharpening without in any way affecting the integrity and rigidity of the main body.

Another object is to provide simple means whereby the blade may be adjusted lengthwise in its holder in the direction of length of its cutting edges to compensate for wear and to maintain the blade in such position that the pressure of the cutting edges against the work will be opposed by the entire length of the blade thereby reducing to a minimum the liability of vibration of the blade and resultant irregularity of its cutting operation upon the work.

A still further object is to provide means whereby the blade may be easily and quickly adjusted to different angles on the holder.

Other objects and uses relating to specific parts of the two will be brought out in the following description.

In the drawings:—

Figure 1, is a front face view of a preferred form of cutting tool embodying the features of our invention.

Fig. 2, is a central lengthwise sectional view of the same tool taken on line 2—2 Fig. 1.

Fig. 3, is a perspective view of the detached blade before sharpening.

Fig. 4, is a face view of a modified form of cutting tool.

Fig. 5, is a longitudinal sectional view taken on line 5—5 Fig. 4, the blade being shown by dotted lines and its supporting bolt in section.

Fig. 6, is a perspective view of the blade shown in Fig. 4 before sharpening.

Fig. 7, is a face view of a further modified form of cutting tool.

Fig. 8, is a perspective view of the blade shown in Fig. 7, before sharpening.

The cutting tool as shown in Figs. 1 and 2 comprises a blade —1— and a suitable holder therefor consisting in this instance of a substantially rectangular shank or bar —2— having its blade supporting end or head bifurcated to form a lengthwise slot —3— extending from front to rear substantially midway between the sides of the shank —2— and opening through the adjacent end face thereof, the width of the slot —3— being substantially the same as the thickness of the main body of the blade —1— to permit the latter to move easily therein without lateral lost motion.

The head of the holder —2— is also apertured transversely to form a bolt opening —4— extending through the opposite walls of the slot —3— to receive a clamping bolt —5— by which the blade —1— is held in operative position upon the holder. The blade —1— is cut to the desired length from a stock bar of the same cross sectional form and size as the finished blade, both longitudinal edges being of the same cross sectional form and size and in this instance converge outwardly from the central portion or main body which is substantially flat and of equal thickness throughout its length.

That is, the opposite faces of the main body of the blade are flat and parallel while its end faces are also flat and parallel and disposed at right angles to the side faces so that the blade before grinding or sharpening is rectangular in plan and of somewhat greater length than width, but of considerably less thickness than its width.

In preparing the cutter blade for use, the end faces of both of the longitudinal cutting edges are slightly under cut by grinding at an angle to the corresponding end faces of the main body as shown more clearly in Fig. 2, so as to cause the cutting edge to enter more gradually into the work, it being understood that the blades are usually hardened by tempering before grinding or sharpening.

It is now evident that all of the four cutting ends of the blade are available for use by simply reversing the blade end for end or edge for edge in the tool holder and that when those edges are dulled they may be readily sharpened by simply grinding the end faces of either beveled edge without in any way deforming the cross sectional contour of said edges thus permitting the use of both edges of the same blade through approximately their entire lengths, and still retaining the original length and rigidity of the central main body which are important factors not only in greatly increasing the life of the blade but also in reducing the liability of vibration and consequent chatter to a minimum.

Suitable means are provided for adjusting the blade in the holder as its cutting edges wear away and for this purpose the blade is provided with a central lengthwise row of in this instance three apertures or bolt openings —6— for receiving the clamping bolt —5— said apertures being arranged an equal distance from the opposite longitudinal edges of the blade to permit the latter to be reversed edge for edge or end for end by simply loosening the bolt —5— and a separate clamping device presently described.

This separate clamping device as shown in Figs. 1 and 2 comprises a clamping block —7—, a plunger —8—, an adjusting screw —9— for the plunger —8— and an additional adjusting screw —10— which coöperates with the plunger —8— and adjusting screw —9— to vary the angle of the blade —1— relatively to the holder —2—.

The clamping block —7— is movable in the slot —3— of the holder —2— and is provided with a lengthwise groove for receiving the adjacent edge of the cutter blade —1— said groove being of substantially the same cross sectional form as that of the edges of the blade so that the walls thereof may fit snugly against the adjacent edge of the blade to receive the direct pressure of the adjacent ends or bearings of the plunger —8— and adjusting screw —9— thereby preventing mutilation of the adjacent edge of the blade.

The block —7— may be tightened and released upon and from the adjacent edge of the blade —1— by means of the members —8— and —10— which are adjustably mounted in the holder —2— and bear upon the adjacent edge of the block —7— at points at opposite sides of a medial line of the holder passing through the axis of the bolt —5— so that by tightening one of the members and loosening the other member the blade —1— may be adjusted to different angles about the axis of the pivotal bolt —5— after which bolt members may be tightened to firmly lock the blade in the holder and upon said bolt, the set screw —9— being arranged diagonally of the holder and having its head protruding through the front side thereof where it is accessible for manipulation by a suitable wrench as shown in Figs. 1 and 2.

In the modification shown in Figs. 4, 5 and 6, the head of the holder is recessed in one side to receive the tool and is provided with a transverse rib —11— across the face thereof, the blade —1— having its opposite faces provided with central lengthwise grooves —12— either of which is adapted to receive the rib —11— when the blade is applied to the face of the holder to hold said blade against rocking movement when mounted upon the bolt —5— and thereby clamped in operative position, the rib —11— being disposed at an angle to the axis of the holder to support the blade at the same angle. Otherwise, the blade is substantially the same as that shown in Figs. 1, 2 and 3.

In the modification shown in Figs. 7 and 8 the head of the holder —2— is recessed at —13— in one side approximately the thickness of the blade —1— for receiving said blade which is mounted upon the bolt —5— and clamped in its operative position by means of a groove clamping member —7'— and adjusting screw —9'— somewhat similar to the clamping block —7— and adjusting screw —9— shown in Figs. 1 and 2.

In this instance the opposite edges of the blade are of slightly different cross sectional form than that shown in Figs. 3 and 6 in that they are rounding in cross section, but otherwise the blade is substantially the same as that shown in Figs. 3 and 6 ready for sharpening to produce the complete blade as shown in Fig. 2 with the exceptions noted.

The operation of our invention will now be readily understood upon reference to the foregoing description and accompanying drawing and while the constructions shown in Figs. 1, 2 and 3 have proven by actual use to be highly practical and efficient, and the modifications are preferable for some operations, we do not wish to limit ourselves to either of those forms since it is evident that the manner of clamping the blade in the holder may be materially varied without departing from the spirit of this invention.

What we claim is:

1. In a tool of the character described, a cutting blade having a series of apertures along its longitudinal center and its opposite lengthwise edges of the same cross-sectional form and parallel with the row of apertures, the end faces of said longitudinal edges being undercut beyond the corresponding end faces of the main body.

2. In a tool of the character described, the combination of a holder having an apertured head and a bearing at one side of the aperture, a cutting blade having a row of apertures along its longitudinal center registrable one at a time with the aperture in the head, said blade having its opposite lengthwise edges of the same cross-sectional form and equally distant from the apertures, one of said edges resting against the bearing.

3. In a tool of the character described, a cutting blade having a series of apertures along its longitudinal center and its opposite lengthwise edges of the same cross-sectional form and parallel with the row of apertures, in combination with a holder having means for entering either aperture to lock the blade to the holder, and a clamp adjustably engaged with one edge of the blade to tighten it upon the first named means.

4. In a tool of the character described, a holder having an apertured head and a guideway transversely of the axis of the aperture, in combination with a cutter blade adjustable endwise in said guideway and provided with apertures registrable with the aperture in the head, a bolt passed through the registering apertures, a clamp on the head engaging one of the lengthwise edges of the blade and adjustable transversely of the axis of the bolt for tightening the blade on said bolt.

5. In a tool of the character described, a holder having an apertured head and a guideway transversely of the axis of the aperture, in combination with a cutter blade adjustable endwise in said guideway and provided with apertures registrable with the aperture in the head, a bolt passed through the registering apertures, and means on the holder for adjusting the blade rotarily about the axis of the said bolt.

In witness whereof we have hereunto set our hands this 3d day of March, 1919.
   EDWARD I. CHAPIN.
   FRANK E. BAKER.

Witnesses:
 H. E. Chase,
 Anna G. Jordan.